Patented May 28, 1929.

1,714,637

UNITED STATES PATENT OFFICE.

CURT SCHUMANN, EDUARD MÜNCH, OTTO SCHLICHTING, AND BRUNO CHRIST, OF LUDWIGSHAFEN-ON-THE-RHINE, GERMANY, ASSIGNORS TO GRASSELLI DYESTUFF CORPORATION, OF NEW YORK, N. Y., A CORPORATION OF DELAWARE.

PRODUCTION OF ALDEHYDE SULPHOXYLATES.

No Drawing. Application filed April 9, 1928, Serial No. 268,793, and in Germany April 22, 1927.

This invention relates to the production of aldehyde sulphoxylates.

The production of aldehyde sulphoxylates has hitherto been effected by reducing aldehyde bisulphites with metals, with or without an addition of acids, or by electrolytic reduction.

We have now found that aldehyde sulphoxylates of aldehydes containing at least two carbon atoms can be prepared from the corresponding aldehyde bisulphites in a simple manner and with good yields by the reduction of the latter with hydrogen or a gas containing or supplying hydrogen, these gases being hereinafter referred to as reducing gases, in the presence of hydrogenating catalysts. Particularly suitable catalysts are the metals of the group 8 of the periodic system, especially nickel and cobalt, and also platinum and the like. They may be used alone or on carriers, in the presence or absence of other metals or activators, such as copper, zinc, silver, tungsten, molybdenum, chromium, compounds thereof, or oxids or sulphides of metals of various other groups. The reduction may also be carried out in the presence of inert gases, and preferably in aqueous solutions of the aldehyde bisulphites. Salts such as sodium sulphate or calcium chlorid, or organic substances such as alcohol, may also be present if desired.

The catalysts generally retain their activity for a considerable period, although, in many instances, they soon become laden with sulphur. After separation from the reaction liquid, the spent catalysts may be regenerated in a simple manner by treatment with hydrogen at an elevated temperature.

Catalysts which display a very high activity in connection with other catalytic reductions are preferably subjected, prior to use, to supplementary treatment with the object of suppressing, to a sufficient degree, their capacity for producing secondary reactions, and of ensuring a prolongation of the activity of these catalysts. This can be effected in various ways, for example by an admixture of enfeebled or regenerated catalysts, followed, if necessary, by heating, or by treating the catalysts, prepared in the usual way, with suitable gases, for example carbon dioxid, containing, when required, small amounts of steam, or oxygen at elevated temperatures.

The process according to the present invention may be carried out at ordinary or raised temperatures, for example at 60° C. or over. The reduction already takes place under ordinary pressure, but is substantially facilitated by the application of high pressure, which also accelerates the reaction. For example the other conditions being equal, the yield of aldehyde sulphoxylate obtained with a working pressure of 50 atmospheres is 10 times as great as under ordinary pressure whilst with a pressure of 150 atmospheres the yield is increased about 15 to 20 fold. With pressures of 300 to 400 atmospheres, quantitative yields are obtained in a rather short time. The yields may also be considerably improved by a suitable selection of the catalyst and of the working temperature employed.

The hydrosulphite compounds of aldehydes may also serve as initial materials in the process of the present invention, such as are obtained, for example, by the action of an aldehyde on hydrosulphite, and the product thus obtained may be reduced to aldehyde sulphoxylate as hereinbefore described. The said hydrosulphite compounds are also understood to be comprised in the expression "aldehyde bisulphites".

The following examples will further illustrate the nature of the invention but the invention is not restricted to the examples. The parts are by weight.

*Example 1.*

20 parts of a nickel-kieselguhr catalyst corresponding to 5 parts of nickel, are suspended in 250 parts of a 10 per cent aqueous solution of benzaldehyde bisulphite, the mixture being then agitated for 40 hours at 50° C. with hydrogen under a pressure of 120 atmospheres. After separating the catalyst, a solution is obtained containing a yield of benzaldehyde sulphoxylate corresponding to 42 per cent of the theoretical one.

Other aldehyde bisulphites, such for example as acetaldehyde bisulphite, may also be reduced to the corresponding sulphoxylates in a similar manner.

Catalysts which contain zinc sulphid or zinc oxid, barium carbonate, beryllium oxid and the like, in addition to nickel, may also be used.

Example 2.

200 parts of a 14 per cent aqueous solution of benzaldehyde bisulphite and 15 parts of a nickel-kieselguhr catalyst, activated with vanadium and prepared at from 420° to 450° C. are agitated for 15 hours at ordinary temperature with hydrogen under a pressure of from 120 to 140 atmospheres. After removal of the catalyst, a clear solution is obtained which contains approximately 90 per cent of the theoretical yield of benzaldehyde sulphoxylate. This is recovered, as handsome crystalline lamellæ, with a high degree of purity, by rendering the solution slightly alkaline, with caustic soda, separating the benzaldehyde originating from the benzaldehyde bisulphite, and concentrating the solution in vacuo.

If the solution be treated with the calculated amount of formaldehyde, formaldehyde sulphoxylate is produced which may be obtained in any known or suitable manner.

The nickel-vanadium catalyst may be replaced by a nickel-tungsten or nickel-vanadium-tungsten catalyst, the yields obtained being similar to those with the nickel-vanadium catalyst already described.

Example 3.

20 parts of m-tolylaldehyde bisulphite are dissolved in 200 parts of water and a hydrogen ion concentration pH of between 7 and 7.5 is adjusted in the solution by means of normal sodium hydroxid solution. 15 grams of a catalyst comprising nickel deposited on kieselguhr and activated with vanadium are added to the solution, air being carefully excluded and the mixture is agitated for 5 hours at 0° C. under a hydrogen pressure of 120 atmospheres. When working up the product in the ordinary way m-tolylaldehyde sulphoxylate is obtained with a yield of over 50 per cent. If in place of tolylaldehyde bisulphite a bisulphite compound of a hydroxyaldehyde, for example salicylaldehyde, is employed, similar yields are obtained when working according to the same process.

What we claim is:—

1. A process for the production of aldehyde sulphoxylates of aldehydes containing at least two carbon atoms, which consists in reducing the corresponding aldehyde bisulphite with a reducing gas in the presence of a hydrogenating catalyst.

2. A process for the production of aldehyde sulphoxylates of aldehydes containing at least two carbon atoms, which consists in reducing the corresponding aldehyde bisulphite with a reducing gas in the presence of a hydrogenating catalyst on a carrier.

3. A process for the production of aldehyde sulphoxylates of aldehydes containing at least two carbon atoms, which consists in reducing the corresponding aldehyde bisulphite with a reducing gas in the presence of a hydrogenating catalyst activated by an admixture selected from the group consisting of copper, zinc, silver, tungsten, molybdenum and chromium and compounds thereof.

4. A process for the production of aldehyde sulphoxylates of aldehydes containing at least two carbon atoms, which consists in reducing the corresponding aldehyde bisulphite with a reducing gas in the presence of a hydrogenating catalyst comprising a metal of the group 8 of the periodic system.

5. A process for the production of aldehyde sulphoxylates of aldehydes containing at least two carbon atoms, which consists in reducing the corresponding aldehyde bisulphite with hydrogen in the presence of a hydrogenating catalyst at an elevated pressure.

6. A process for the production of aldehyde sulphoxylates of aldehydes containing at least two carbon atoms, which consists in reducing the corresponding aldehyde bisulphite with a reducing gas in the presence of a hydrogenating catalyst comprising a metal of the group 8 of the periodic system, activated by an admixture selected from the group consisting of copper, zinc, silver, tungsten, molybdenum and chromium and compounds thereof on a carrier.

7. A process for the production of aldehyde sulphoxylates of aldehydes containing at least two carbon atoms, which consists in reducing the corresponding aldehyde bisulphite with hydrogen in the presence of nickel deposited on kieselguhr.

8. A process for the production of aldehyde sulphoxylates of aldehydes containing at least 2 carbon atoms, which consists in reducing the corresponding aldehyde bisulphite with hydrogen in the presence of nickel activated by vanadium and deposited on kieselguhr.

In testimony whereof we have hereunto set our hands.

CURT SCHUMANN.
EDUARD MÜNCH.
OTTO SCHLICHTING.
BRUNO CHRIST.